United States Patent
Johnson et al.

(10) Patent No.: US 7,770,381 B2
(45) Date of Patent: Aug. 10, 2010

(54) DUCT BURNING MIXED FLOW TURBOFAN AND METHOD OF OPERATION

(75) Inventors: James E. Johnson, Fairfield, OH (US); Ronald B. Steinmetz, Colerain Township, OH (US)

(73) Assignee: General Electric Company, Schenectady, NY (US)

(*) Notice: Subject to any disclaimer, the term of this patent is extended or adjusted under 35 U.S.C. 154(b) by 904 days.

(21) Appl. No.: 11/612,116

(22) Filed: Dec. 18, 2006

(65) Prior Publication Data

US 2008/0141655 A1 Jun. 19, 2008

(51) Int. Cl.
*F02K 3/10* (2006.01)
*F02K 3/12* (2006.01)

(52) U.S. Cl. ............... 60/263; 60/226.1; 60/262; 60/226.3

(58) Field of Classification Search ........ 60/226.3, 60/204, 224, 226.1, 262, 762, 761, 225, 263; 239/265.17
See application file for complete search history.

(56) References Cited

U.S. PATENT DOCUMENTS

| | | | | | |
|---|---|---|---|---|---|
| 2,887,845 | A | * | 5/1959 | Hagen | 60/39.826 |
| 3,060,679 | A | * | 10/1962 | Schmitt | 60/224 |
| 3,161,018 | A | * | 12/1964 | Sandre | 60/262 |
| 3,677,012 | A | * | 7/1972 | Batscha | 60/262 |
| 3,693,354 | A | * | 9/1972 | Hull, Jr. | 60/765 |
| 3,797,233 | A | * | 3/1974 | Webb et al. | 60/791 |
| 3,987,621 | A | * | 10/1976 | Sabatella et al. | 60/204 |
| 3,999,378 | A | * | 12/1976 | Tatem et al. | 60/737 |
| 4,050,242 | A | * | 9/1977 | Dusa | 60/204 |
| 4,069,661 | A | * | 1/1978 | Rundell et al. | 60/204 |
| 4,080,785 | A | * | 3/1978 | Koff et al. | 60/226.3 |
| 4,137,708 | A | | 2/1979 | Aspinwall et al. | |
| 5,311,735 | A | * | 5/1994 | Orlando | 60/204 |
| 5,832,715 | A | | 11/1998 | Dev | |
| 5,867,980 | A | * | 2/1999 | Bartos | 60/226.3 |
| 7,059,136 | B2 | * | 6/2006 | Coffinberry | 60/785 |
| 7,140,174 | B2 | * | 11/2006 | Johnson | 60/226.1 |
| 7,188,467 | B2 | * | 3/2007 | Johnson | 60/226.1 |
| 7,246,484 | B2 | * | 7/2007 | Giffin et al. | 60/268 |
| 7,395,657 | B2 | * | 7/2008 | Johnson | 60/226.1 |
| 7,437,876 | B2 | * | 10/2008 | Koshoffer | 60/761 |
| 7,565,804 | B1 | * | 7/2009 | Frash et al. | 60/762 |
| 7,574,866 | B2 | * | 8/2009 | Roche et al. | 60/761 |
| 2006/0196164 | A1 | * | 9/2006 | Donohue | 060/226.1 |

* cited by examiner

*Primary Examiner*—William H Rodriguez
(74) *Attorney, Agent, or Firm*—Adams Intellectual Property Law; David Narciso

(57) ABSTRACT

A gas turbine engine includes a turbomachinery core operable to generating a first flow of pressurized combustion gases, the core having an exit plane; a fan disposed upstream of the core adapted to extract energy from the core and generate a first flow of pressurized air; a bypass duct surrounding the core which receives a portion of the flow of pressurized air from the fan; a duct burner disposed in the bypass duct, upstream of the exit plane, for receiving the first flow of pressurized air and generating a second flow of pressurized combustion gases; and an exhaust duct disposed downstream of the core and operable to receive and the first and second flows of pressurized combustion gases and to discharge the combined flows downstream.

11 Claims, 3 Drawing Sheets

DUCT BURNING MIXED FLOW TURBOFAN AND METHOD OF OPERATION

BACKGROUND OF THE INVENTION

This invention relates generally to gas turbine engines and more particularly to a turbofan engine having a duct burner.

Some new aircraft designs under study have diverse propulsion needs in terms of sea-level static (SLS) take-off thrust levels, cruise thrust and specific fuel consumption (SFC) levels, engine diameter and length restrictions, and exhaust system shaping (i.e. for "low observables" purposes) that make it difficult to utilize an existing engine or even to define a new non-augmented engine that meets all of these needs. In particular, demanding "hot day", high altitude, short runway requirements can be difficult to meet with unaugmented or "dry" versions of existing engines that also meet applicable fan diameter limitations. Augmented (afterburning) versions of these existing engines are typically too long and are not as amenable to special exhaust system shaping as non-afterburning versions. Non-augmented, higher fan pressure ratio engines can be defined that supply the needed thrust within the diameter and length constraints but they will have higher than desired cruise segment SFC levels.

What is needed in such situations is an augmentation system that can supply a modest (e.g. about 15-25%) increase in take-off thrust for either existing engines, such as low-bypass military turbofan engines, or can be incorporated into a new engine design so a more optimum cruise cycle can be utilized. This augmentation concept must also be compatible with the length and shaping needs of the exhaust system.

Current engine augmentation systems are located in the engine tailpipe downstream of the rear frame. They can easily be sized to provide well in excess of the 15-25% thrust increase mentioned above, but will add appreciable length as well as not being highly adaptable to exhaust system shaping "Duct burners", i.e. augmentation systems placed in a bypass duct of an engine, have been demonstrated in the prior art. However, these duct burners required two separate exhausts, one for the primary stream and one for the augmented bypass stream, increasing the weight, complexity, and cost of the engine.

BRIEF SUMMARY OF THE INVENTION

The above-mentioned shortcomings in the prior art among others are addressed by the present invention, which according to one aspect provides a gas turbine engine, including: a turbomachinery core operable to generating a first flow of pressurized combustion gases, the core having an exit plane; a fan disposed upstream of the core adapted to extract energy from the core and provide a first flow of pressurized air; a bypass duct surrounding the core which receives a portion of the flow of pressurized air from the fan; a duct burner disposed in the bypass duct, upstream of the exit plane, for generating a second flow of pressurized combustion gases; and an exhaust duct disposed downstream of the core and operable to receive and the first and second flows of pressurized combustion gases and to discharge the combined flows downstream.

According to another aspect of the invention, a gas turbine engine includes: a turbomachinery core operable to generating a first flow of pressurized combustion gases, the core having an exit plane; a fan disposed upstream of the core adapted to extract energy from the core and provide a first flow of pressurized air; a bypass duct surrounding the core which receives a portion of the flow of pressurized air from the fan a duct burner disposed in the bypass duct, upstream of the exit plane, for generating a second flow of pressurized combustion gases; an exhaust duct disposed downstream of the core and operable to receive and the first and second flows of pressurized combustion gases and to discharge the combined flows downstream; a first exhaust nozzle disposed downstream of the exhaust duct; a fan outer duct surrounding the bypass duct; a flade stage comprising a supplementary fan disposed in the fan outer duct and driven by the fan for generating a second flow of pressurized air; and a second exhaust nozzle disposed in the exhaust nozzle and adapted to discharge the second flow of pressurized air in a downstream direction.

According to another aspect of the invention, a method of operating a gas turbine engine includes: burning a fuel in a turbomachinery core having an exit plane, to produce a first flow of pressurized combustion gases; generating a first flow of pressurized air using a fan disposed upstream of the core; channeling a portion of the first flow of pressurized air to a duct burner disposed upstream of the exit plane; burning a fuel in the duct burner to produce a second flow of pressurized combustion gases; and combining the first and second flows of pressurized combustion gases in to a mixed exhaust flow downstream of the exit plane.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
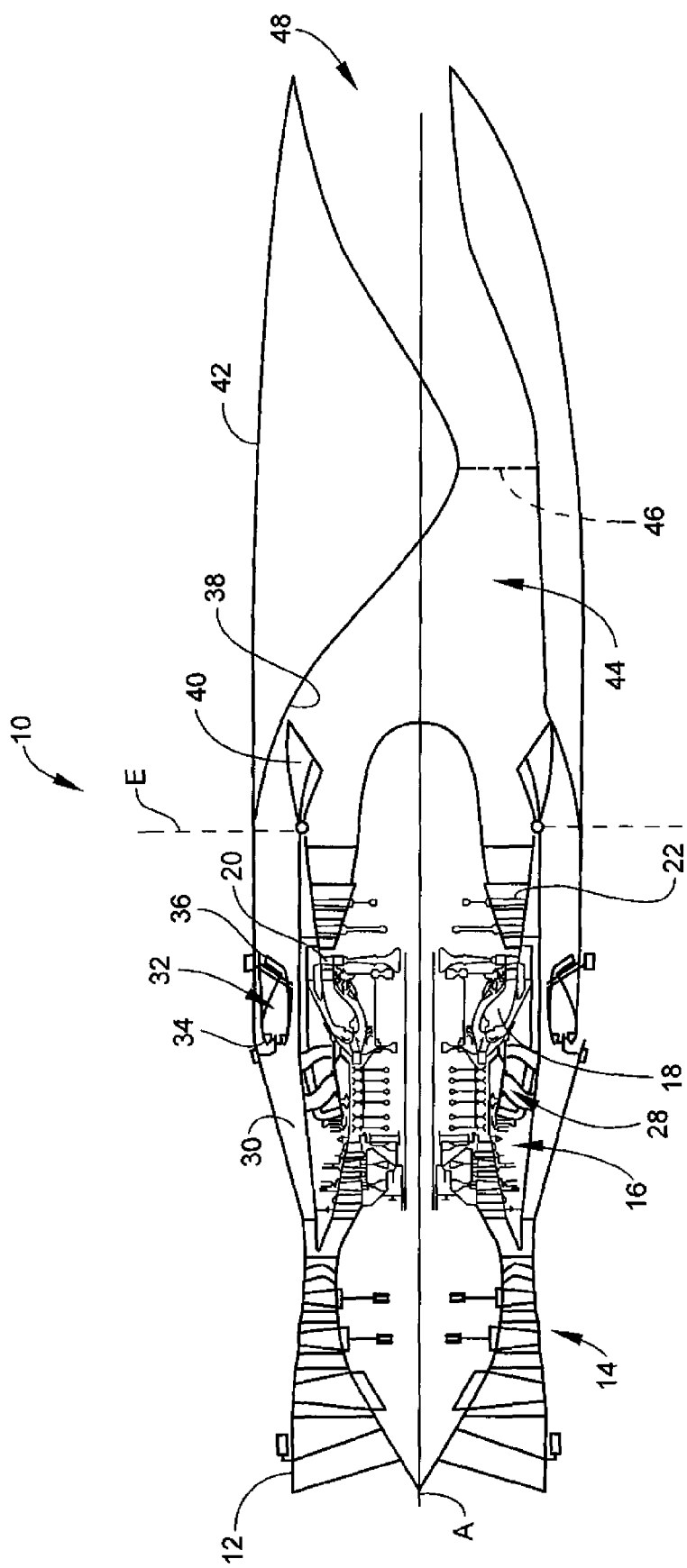
FIG. 1 is a schematic side cross-sectional view of a gas turbine engine constructed according to an aspect of the present invention.

Referring to the drawings wherein identical reference numerals denote the same elements throughout the various views, FIG. 1 illustrates a representative gas turbine engine, generally designated 10. The engine 10 has a longitudinal center line or axis A and an outer stationary annular casing 12 disposed concentrically about and coaxially along the axis A. The engine 10 has a fan 14, compressor 16, combustor 18, high pressure turbine 20, and low pressure turbine 22 arranged in serial flow relationship. In operation, pressurized air from the compressor 16 is mixed with fuel in the combustor 18 and ignited, thereby generating pressurized combustion gases. Some work is extracted from these gases by the high pressure turbine 20 which drives the compressor 16 via an outer shaft 24. The combustion gases then flow into the low pressure turbine 22, which drives the fan 14 via an inner shaft 26.

A portion of the fan discharge flows through the compressor 16, combustor 18, and high-pressure turbine 20, which are collectively referred to as the "core" 28 of the engine 10. Another portion of the fan discharge flows through an annular bypass duct 30 which surrounds the core 28. While the illustrated engine 10 has a conventional three-stage fan as is often found in military low-bypass turbofan engines, the principles of the present invention are equally applicable to other engine configurations so long as a bypass flow is present.

A duct burner 32 comprising one or more fuel injectors 34 and flameholders 36 of a known configuration is disposed within the bypass duct 30, at a point upstream of an exit plane "E" of the flow from the core 28. Fuel feed and ignition fore the duct burner 32 are provided in a known manner, for example using the controls of the engine 10, similar to the manner in which a prior art afterburner would be controlled. If desired, the duct burner 32, or components thereof, may be configured to selectively fold or retract out of the bypass duct 30, so as to minimize flow losses therein when the duct burner 32 is not being used. Cooling air for the duct burner liners and downstream exhaust system needs can be extracted in front of the duct burner 32 to obtain a cooling source at the appropriate temperature and pressure levels.

An exhaust duct 38 is disposed downstream of the core 28, and receives the mixed air flow from both the core 28 and the bypass duct 30. A mixer 40 (for example a lobed or chute-type mixer) is disposed at the juncture of the core 28 and bypass duct 30 flow streams to promote efficient mixing of the two streams. If needed, the mixer 40 may be of the type which can selectively vary its open area, so as to control the back pressure on the fan 14. This type of mixer is sometimes referred to as a variable area bypass injector ("VABI").

A nozzle 42 having an inlet 44, a throat 46, and an exit 48 is disposed downstream of the exhaust duct 38. The throat area, denoted "A8" in accordance with conventional practice, may be variable through the use of moveable components in the nozzle 42, in order to accommodate changes in the operating cycle flow when the duct burner 32 is cycled on and off. It may also be possible, depending on the selected duct temperature, to define a fixed A8 that would provide a useful level of maximum power augmented performance and an acceptable level of dry thrust and cruise SFC. In the illustrated example, the nozzle 42 is a so-called "2-D" design incorporating a serpentine flow path as "low observable" feature to reduce or prevent detection of the hot engine exhaust, and may include a thrust reverser or vectoring feature. However, the present invention may also be used with a conventional axisymmetric nozzle design (not shown).

Figure 2:
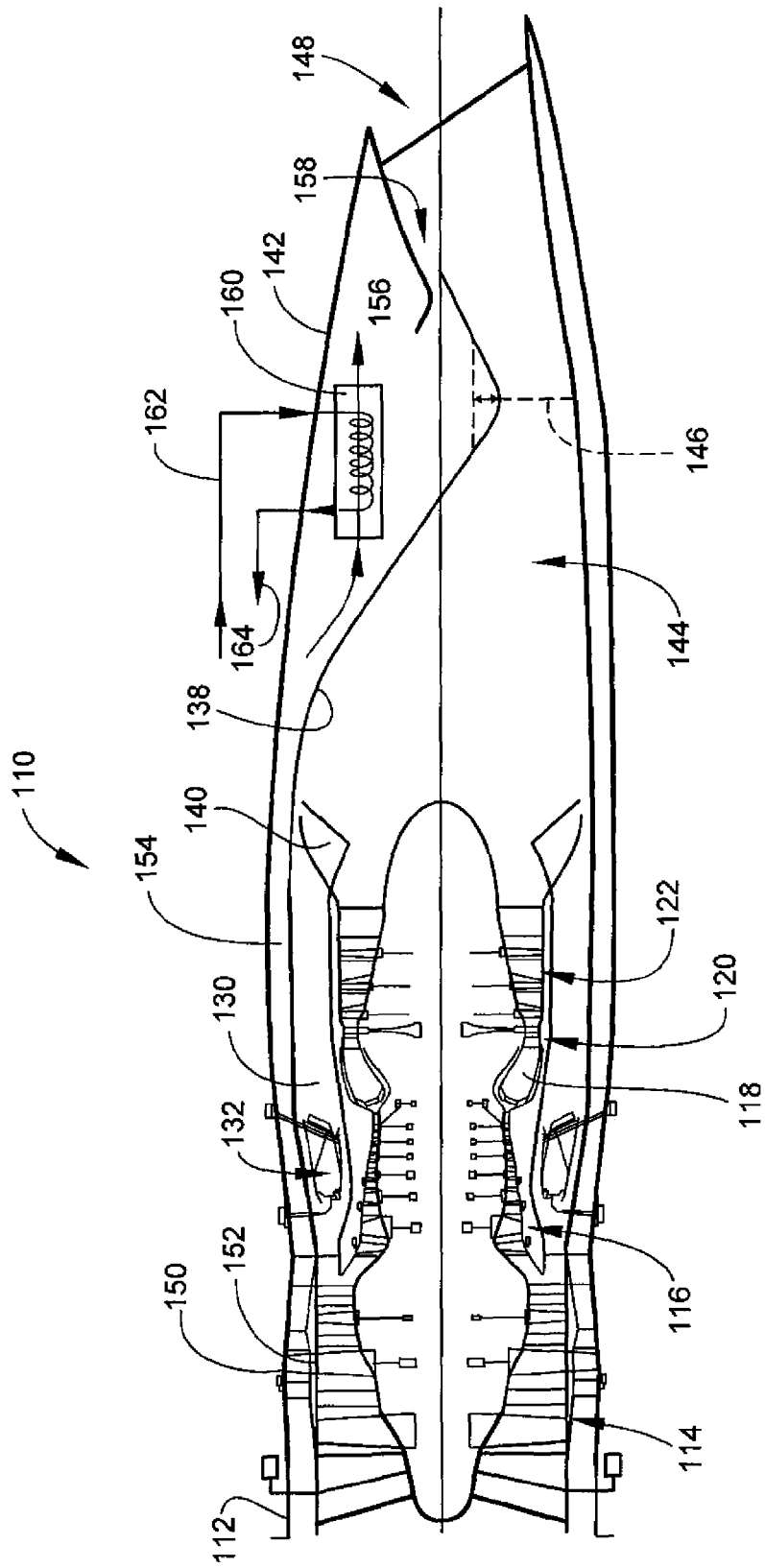
FIG. 2 is a schematic side cross-sectional view of a gas turbine engine constructed according to another aspect of the present invention.

FIG. 2 illustrates an alternative gas turbine engine which includes a duct burner, generally designated 110. The engine 110 is generally similar in construction to the engine 10 and includes outer stationary annular casing 112, a fan 114, compressor 116, combustor 118, high pressure turbine 120, and low pressure turbine 122 arranged in serial flow relationship. The engine 110 also includes a duct burner 132 as described above, disposed within a bypass duct 130, an exhaust duct 138, a mixer 140, and a nozzle 142 having an inlet 144, a throat 146, and an exit 148. The throat area A8 may be variable as described above. In the illustrated example, the nozzle 142 is a "2-D" design incorporating a serpentine flow path.

The engine 110 also includes a supplementary fan, referred to as a "FLADE" stage 150 in the form of a ring of airfoils extending radially outwardly from an annular shroud 152 and driven by the fan 114. The FLADE stage 150 is positioned in a fan outer duct 154 which surrounds the bypass duct 130. The FLADE stage 150 provides an additional flow stream at a different flow and pressure ratio that than of the fan 114. The FLADE stage 150 can be used for optimizing installation losses (i.e. to allow the engine 110 to "swallow" excess airflow from a fixed geometry inlet at high speeds), and to provide additional nozzle cooling. For example, airflow from the FLADE stage 150 may be discharged into an interior space 156 of the nozzle 142 to cool the nozzle surfaces, and then ejected through a slot or FLADE nozzle 158 in the nozzle 142 to provide some supplemental thrust.

Optionally, a heat exchanger 160 may be placed inside the interior space 156 of the nozzle 142. The heat exchanger 160, for example a liquid-to-air type, may be connected to a heat transfer fluid (e.g. fuel or oil) through lines 162 and 164. This allows waste heat to be rejected from the airframe (not shown) and also provides some thrust increase by increasing the temperature of the FLADE discharge flow.

Figure 3:
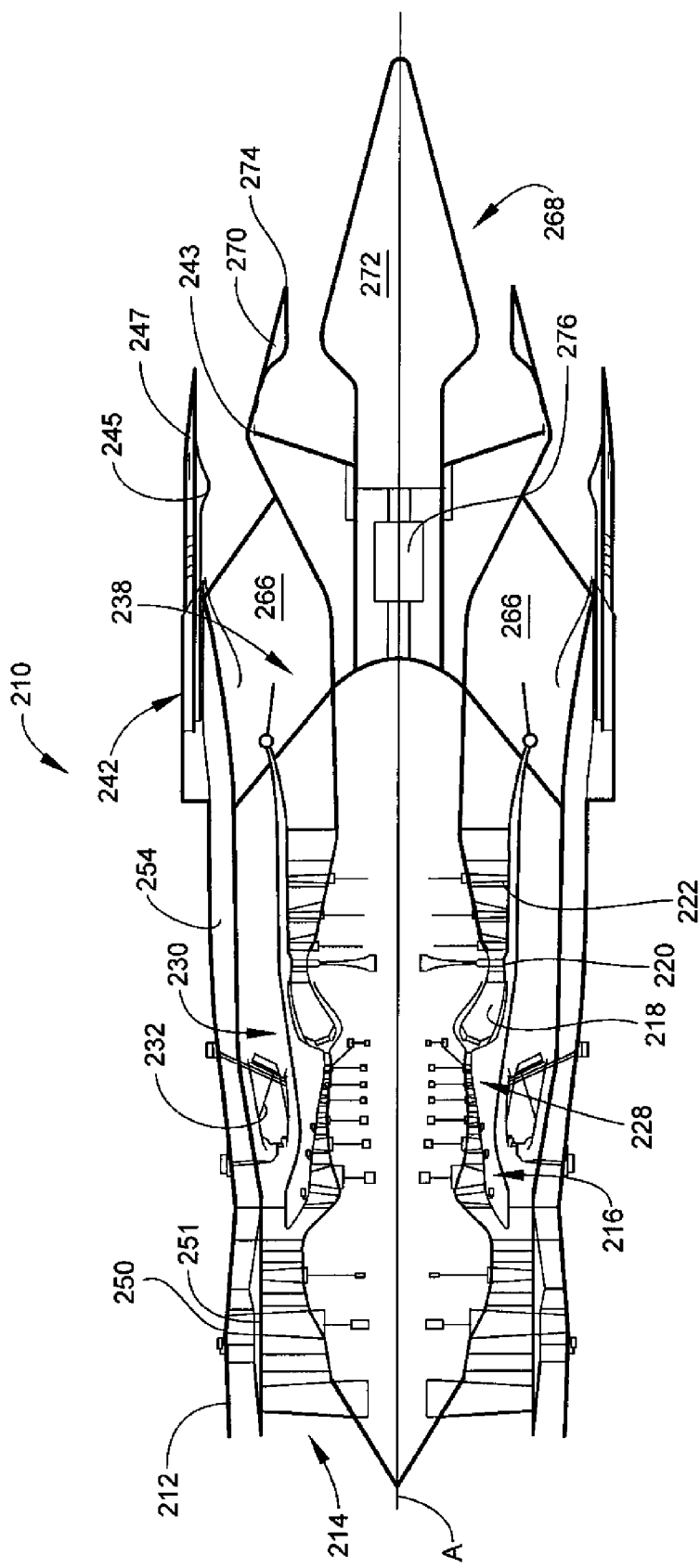
FIG. 3 is a schematic side cross-sectional view of a gas turbine engine constructed according to yet another aspect of the present invention

FIG. 3 illustrates another alternative gas turbine engine 210 which includes a duct burner. The engine 210 is generally similar in construction to the engine 10 and includes outer stationary annular casing 212, a fan 214, compressor 216, combustor 218, high pressure turbine 220, and low pressure turbine 222 arranged in serial flow relationship. The engine 210 also includes a duct burner 232 as described above, disposed within a bypass duct 230, and an exhaust duct 238 which receives the mixed flow from the bypass duct 230 and the engine core 228.

The mixed flow exhaust is discharged through an outer nozzle 242. While various types of nozzles may be used, in this example the outer nozzle 242 is a plug type and includes a centerbody 243, an inner shroud 245, and an outer shroud 247. The centerbody 243 is centered along the longitudinal axis A of the engine 210 and extends in an aft direction. The centerbody 243 includes, sequentially, a small-diameter tapered forward section, a throat section of increased diameter, and an aft section which tapers in diameter to form an aft-facing conical shape. The inner and outer shrouds 245 and 247 may be independently translated to achieve independently variable throat (A8) and exit plane (conventionally denoted "A9") areas during different operating conditions. The construction and operation of such a nozzle is described in published US Patent Application No. US2006/0016171A1, which is assigned to the assignee of the present invention.

The engine 210 also includes a supplementary fan, referred to as a "FLADE" stage 250 in the form of a ring of airfoils extending radially outwardly from an annular shroud 251 and driven by the fan 214. The FLADE stage 250 is positioned in a fan outer duct 254 which surrounds the bypass duct 230. The FLADE stage 250 provides an additional flow stream at a different flow and pressure ratio that than of the fan 214. The FLADE stage 250 can be used for optimizing installation losses (i.e. to allow the engine 210 to "swallow" excess airflow from a fixed geometry inlet at high speeds), to provide additional nozzle cooling, and to provide additional thrust.

In the illustrated example, flow from the fan outer duct 254 is discharged thorough one or more radially-extending hollow struts 266 to an inner nozzle 268. The inner nozzle 266 is a plug type having a shroud 270 (which in this case is formed by a portion of the same structure that defines the centerbody 243 of the outer nozzle 242), and a plug 272. A nozzle throat 274 is defined between the narrowest portion of the shroud 270 and the widest portion of the plug 272. The plug 272 may be translated fore or aft using an actuator 276 to vary the throat area A8 in a known manner. The discharge of the FLADE stage flow through the fan outer duct 254, struts 266, and inner nozzle 268 in this manner provides cooling to structure of the entire exhaust system. This in turn allows higher exhaust temperatures to be used in the outer nozzle. Analytical studies and scale model tests have indicated that at a given level of jet velocity, jet noise can be reduced if the temperature of the jet exhaust is increased while pressure levels are decreased. For the engine 210 shown, fan pressure levels and duct burner temperature levels would be adjusted to arrive at the optimum combination of parameters to minimize jet noise at the prescribed level of mixed stream jet velocity needed to produce adequate take-off thrust. The duct burner 232 could also be used to minimize the engine size and time needed for transonic acceleration and climb to an optimum supersonic cruise flight condition.

The duct burner systems described above can supply modest thrust increases for either existing engines, like military low-bypass military turbofan engines, or can be incorporated into a new engine design so a more optimum cruise cycle can be utilized. For example, SLS thrust increases of about 15%-25% can be achieved with duct temperatures in the 1000° to 1300° C. to (2000° to 2400° F.) range.

Engine designs that are fan flow and/or length limited due to airframe restrictions could benefit from this duct burning thrust augmentation concept by allowing a more cruise efficient, lower fan pressure ratio, higher bypass ratio engine to be used in place of the same thrust and fan flow size higher fan pressure ratio dry engine.

For example, a 3.5 fan pressure ratio, moderate bypass ratio engine with a duct burner that provides about a 20% SLS thrust increase would have the same fan flow and take-off thrust as a 4.5 fan pressure ratio, lower bypass dry engine, while also providing about a 10% lower subsonic cruise SFC.

The foregoing has described a duct burner and a gas turbine engine incorporating a duct burner. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A gas turbine engine, comprising:
    (a) a turbomachinery core operable for generating a first flow of pressurized combustion gases, the core having an exit plane;
    (b) a fan disposed upstream of the core adapted to extract energy from the core and generate a first flow of pressurized air;
    (c) a bypass duct surrounding the core which receives a portion of the flow of pressurized air from the fan;
    (d) a duct burner disposed in the bypass duct, upstream of the exit plane, for receiving the first flow of pressurized air and generating a second flow of pressurized combustion gases;
    (e) an exhaust duct disposed downstream of the core and operable to receive the first and second flows of pressurized combustion gases and to discharge the combined flows downstream; and
    (f) a mixer for receiving the first and second flows of pressurized combustion gases and discharging the combined flows to the exhaust duct, wherein an open area of the mixer is selectively variable.

2. The gas turbine engine of claim 1 further including an exhaust nozzle with a variable throat area disposed downstream of the exhaust duct.

3. The gas turbine engine of claim 2 wherein the exhaust nozzle includes a serpentine flow path.

4. The gas turbine engine of claim 2 further including:
    (a) a fan outer duct surrounding the bypass duct; and
    (b) a flade stage comprising a supplementary fan disposed in the fan outer duct and driven by the fan for generating a second flow of pressurized air; and
    (c) a flade nozzle disposed in the exhaust nozzle and adapted to discharge the second flow of pressurized air in a downstream direction.

5. The gas turbine engine of claim 2 further including a heat exchanger disposed in an interior space of the exhaust nozzle.

6. The gas turbine engine of claim 1 wherein at least a portion of the duct burner is moveable between an extended position within the bypass duct, and a retracted position outside of the bypass duct.

7. A gas turbine engine, comprising:
    (a) a turbomachinery core operable to generating a first flow of pressurized combustion gases, the core having an exit plane;
    (b) a fan disposed upstream of the core adapted to extract energy from the core and provide a first flow of pressurized air;
    (c) a bypass duct surrounding the core which receives a portion of the flow of pressurized air from the fan;
    (d) a duct burner disposed in the bypass duct, upstream of the exit plane, for generating a second flow of pressurized combustion gases;
    (e) an exhaust duct disposed downstream of the core and operable to receive the first and second flows of pressurized combustion gases and to discharge the combined flows downstream through a first exhaust nozzle disposed downstream of the exhaust duct;
    (f) a fan outer duct surrounding the bypass duct;
    (g) a flade stage comprising a supplementary fan disposed in the fan outer duct and driven by the fan for generating a second flow of pressurized air; and
    (h) a second exhaust nozzle disposed in the exhaust nozzle and adapted to discharge the second flow of pressurized air in a downstream direction.

8. The gas turbine engine of claim 7 in which the first nozzle is plug nozzle having a variable throat area.

9. The gas turbine engine of claim 8 in which the first nozzle has a variable exit area.

10. The gas turbine engine of claim 8 in which the second nozzle is a plug nozzle having a variable throat area.

11. The gas turbine engine of claim 8 further including at least one generally radially-extending hollow struts disposed in fluid communication with the fan outer duct and the second exhaust nozzle.

* * * * *